United States Patent

[11] 3,633,349

[72] Inventor Bernard C. Mathews
 Box 70, Crystal Lake, Ill. 60014
[21] Appl. No. 12,095
[22] Filed Feb. 17, 1970
[45] Patented Jan. 11, 1972

[54] BLADE FOR FLAIL-TYPE MOWING MACHINES AND THE LIKE
 11 Claims, 6 Drawing Figs.

[52] U.S. Cl. .................................................. 56/294
[51] Int. Cl. .................................................. A01d 55/20
[50] Field of Search .......................................... 56/294, 504, 505, 26, 12.7

[56] References Cited
UNITED STATES PATENTS

| | | | |
|---|---|---|---|
| 2,509,343 | 5/1950 | Henderson | 56/294 |
| 3,159,957 | 12/1964 | Mathews | 56/504 X |
| 3,402,534 | 9/1968 | Phillips | 56/24 |
| 3,411,279 | 11/1968 | Panek et al. | 56/294 |
| 3,422,612 | 1/1969 | Panek et al. | 56/294 |

Primary Examiner—Robert Peshock
Assistant Examiner—J. A. Oliff
Attorney—Zabel Baker York and Jones ABSTRACT: The blade is connected to the blade-mounting pin of the rotor by a link, which is a steel strip disposed in a plane parallel to the rotor axis, and having a U-type open loop at its outer end. The blade has a shank disposed in the link, two 90° side arms, and diagonal arm extensions. The extensions each have cutting edges facing both forwardly and rearwardly which cross each other to provide a combined cutting edge equal in width to the overall width of the blade member. The extensions are angularly offset to provide a clearance at the crossing point. The shank is maintained in the open loop of the link by a removable keeper pin and cotter pin which permits reversal of the blade to provide fresh cutting edges.

PATENTED JAN 11 1972 3,633,349
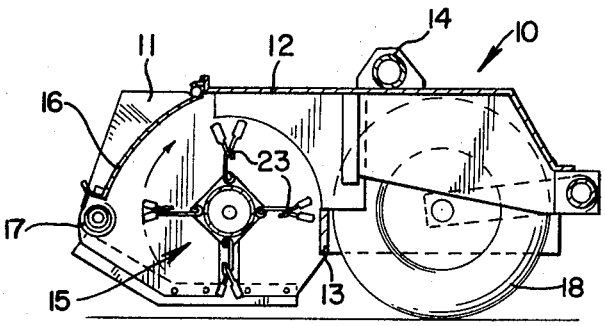
FIG_1_
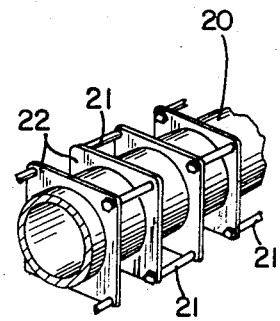
FIG_2_
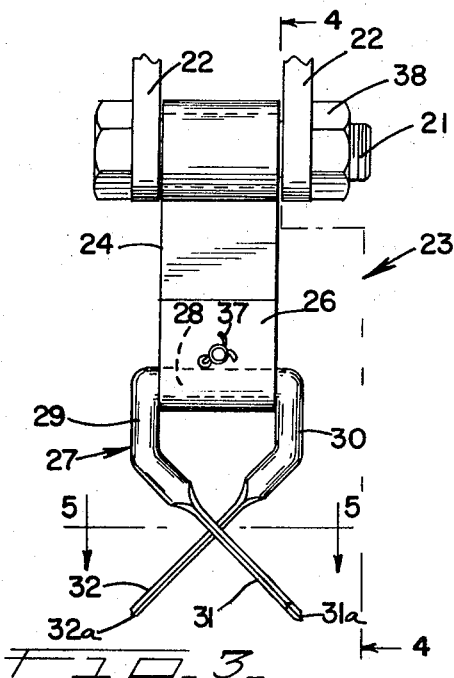
FIG_3_
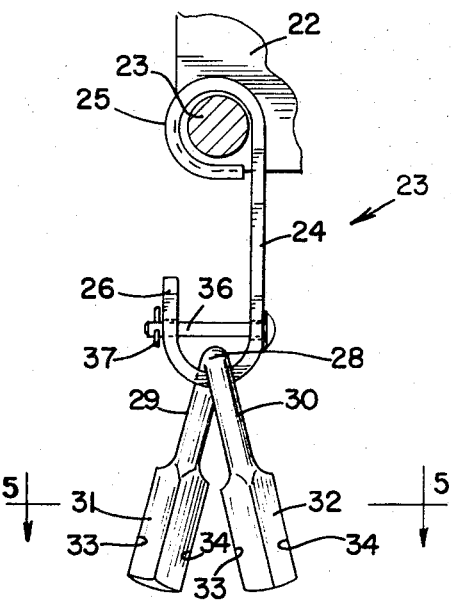
FIG_4_
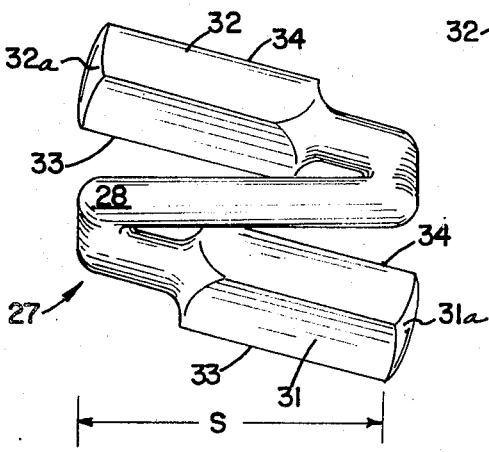
FIG_6_
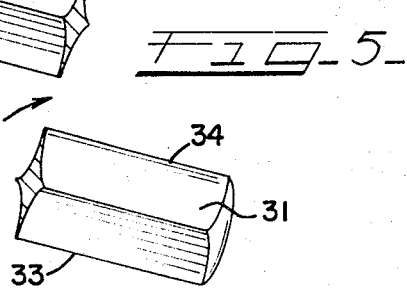
FIG_5_
INVENTOR
BERNARD C. MATHEWS
BY Zabel, Boker, York & Jones
ATT'YS.

BLADE FOR FLAIL-TYPE MOWING MACHINES AND THE LIKE

This invention relates to an improved blade and blade assembly for flail-type mowing machines, choppers and other flail-type forage harvesters.

It is an object of the present invention to provide a blade assembly in which the blade element itself is easily replaceable. In flail-type mowers, the cutting edge tends to get nicked due to hitting stones, with the result that the individual blades have to be removed for resharpening, or replacement.

One of the main advantages of a flail-type mower is that a particular blade can swing back when a rock is engaged, and this does not interfere too materially with the smooth action of the rotor as a whole. However, some blades are of quite heavy construction with the result that when a rock is hit, there will be a certain amount of vibration, and furthermore, the heavier the blade the greater the possible damage to it.

According to my invention, I provide a relatively lightweight blade, and the blade assembly also includes a link, with the result that the interference to the smooth rotating movement to the rotor is minimized when the blade hits a rock because only the blade portion is displaced rearwardly.

Another object of my invention is to provide a blade assembly in which the articulations or hinges are of substantial length in the axial direction so as to minimize the wear at the hinge point. For instance in some blade constructions, the blade element is a strip of metal, the plane of which at the hinge point is perpendicular to the axis of the rotor. In other words, the strip has a hole punched in it and the hole is traversed by the link or other mounting pin. In this prior construction, all of the wear is concentrated along that edge of the hole which is engaged by the link or pin, and where the thickness of the strip is from one-eighth to one-fourth of an inch, the metal wears rather rapidly. In extreme instances, the hole or the link will wear through and the blade will fly off.

Accordingly to my invention the link element is a strip disposed in a plane which is parallel to the rotor axis, and the strip is substantially 2 inches wide. Thus, a bearing surface 2 inches wide is provided in which the wear is distributed over a much greater area of metal.

According to my invention, I provide a blade which includes crossed cutting edges, as well as a shank portion of a substantial length which cooperates with the loop of the link. This has been found to provide a satisfactory combination of long-wearing blade with lightweight together with the other advantages above mentioned. Furthermore, my arrangement provides a reversible blade so that when one cutting edge is worn the life of the blade may be doubled by removing the blade, reversing and replacing it.

In the drawings:

FIG. 1 is a sectional view of a flail-type mower embodying my invention;

FIG. 2 is a fragmentary section of the rotor showing the blade-mounting pins;

FIG. 3 is a front elevation of one of the blade assemblies shown in FIG. 1;

FIG. 4 is a side elevation of FIG. 3 taken along the line 4—4 FIG. 3;

FIG. 5 is a plan section taken along lines 5—5 of FIGS. 3 and 4; and

FIG. 6 is a top plan view of the blade member alone.

The mower comprises a main frame 10 which includes side plates 11 which are connected to each other by a top plate 12 and a crossbar 13. A transverse tubular member 14 connects the main frame 10 to a drawbar assembly, not shown. The details of the mower are fully described in my U.S. Pat. Nos. 3,159,957 and 3,159,959 granted Dec. 8, 1964.

The side plates 11 support a rotor 15 which is driven in the direction of the arrow by suitable means. A front wall 16, which may be hingedly mounted on the top plate 12, encloses the upper forward portion of the rotor 15. A plant deflector in the form of a roller 17 may be carried at the lower end of the front wall 16. The mower as a whole is partially supported by wheels, of which one wheel 18 is shown, and is partially supported from the tractor by the usual draw bar assembly.

The rotor 15 comprises a tubular member 20 shown in FIG. 2 having a number of pins 21 arranged parallel to the rotor axis upon which the blade assemblies may be mounted. The pins 21 may be mounted in spaced relation to the tubular member by any suitable brackets, such as the plates 22 shown in FIG. 2.

The blade assembly 23 shown in FIGS. 3 and 4 comprises a link 24 and a blade member 27. The link 24 is a steel strip with its plane arranged parallel to the axis of the rotor 15 and elements 20 and 21. The link 24 has a closed loop 25 at its upper end which surrounds the blade mounting pin 21 and provides a hinged joint. The lower end of the link 24 comprises a U-type open loop 26. The blade member 27 comprises at its upper portion a C-shaped structure comprising a horizontal shank 28 and side arms 29 and 30 arranged at substantially 90° to the shank. The side arms and the shank are of circular cross section, and the shank is received within the open loop 26 and secured therein by a keeper pin 36 and a cotter pin 37. The pin 36 passes through aligned holes in the opposite sides of the open loop 26.

The side arms 29 and 30 have diagonally disposed extensions 31 and 32. The plane of elements 29–31 diverges outwardly from the plane of elements 30–32 so that the extensions 31 and 32 may cross each other, providing a clearance 35 therebetween. The outer portions of the diagonal extensions 31 and 32 are each shaped to provide a forwardly facing cutting edge 33, and a rearwardly facing cutting edge 34. The length of the extensions is such that the end 31a of extension 31 is extended laterally to a point substantially even with the extreme right-hand surface of the side arm 30. The end 32a of extension 32 extends to a point about even with the extreme left-hand surface of the side arm 29. Thus the two crossed and overlapping blade portions 31 and 32 provide a combined cutting edge which is substantially equal to the overall width of the blade member 27 at its widest portion, the width of the swath being cut by the combined blade portions being indicated by the letter S in FIG. 6.

The swath S is therefore wider that the link 24. The pins 21 are preferably staggered so that axially adjacent pins are angularly offset from each other. Thus the swath S cut by one blade member will overlap the swath cut by an axially adjacent but angularly offset blade member.

The blade member 27 is made from a high carbon steel, and the cutting edges 33 and 34 are forged on to the rod stock blank. Then the blank is bent into the final shape and heat-treated.

The link 24 is made of similar high-carbon strip steel stock, and then formed and heat-treated.

The blade-mounting pins 21 can be in the form of threaded nuts and bolts of suitable high-carbon heat-treated steel, and the nuts 38 are tacked welded to the bolts 21 after tightening.

The clearance 35 is of the order of from one-fourth to three-eighths inch. Without the clearance, the grass tends to catch on the blade at the point of intersection, with the result that a mass of grass builds up with continued revolutions. The clearance or gap 35 permits the grass to fly outwardly, off of the blade portions 31 and 32, which are disposed about 45° to the horizontal.

In spite of the clearance 35, the blade member 27 cannot become dislodged from the link 24 because the location of the keeper pin 36 is sufficiently close to the shank 28 as to prevent a canting and subsequent inversion the blade member 27.

The present construction avoids any split-ring blade construction in which the very substantial centrifugal forces involved tend to open up the ring at the split.

When the cutting edges 33 become worn or nicked, withdrawal of the keeper pin 36 permits the blade member 27 to be reversed so that the fresh edges 34 are presented for mowing, thus the life of the blade member 27. Substitution of a new blade is similarly accomplished with ease.

What is claimed is:

1. A blade for the rotor of a flail-type mowing machine, said rotor having a blade-supporting link, said blade comprising a shank and two side arms, said side arms each including a diagonally disposed extension, said extensions being angularly offset from each other with respect to the longitudinal axis of said shank and crossing each other, and said extensions each having a forwardly and a rearwardly facing surface, each of said forwardly facing surfaces having a forwardly facing cutting edge therealong the angular offset of said extensions providing a clearance between the forwardly facing edge of one extension and the rearwardly facing surface of the other extension at the point of crossing.

2. A blade as claimed in claim 1 in which said extensions are also each provided with a rearwardly facing cutting edge along said rearwardly facing surface.

3. A blade assembly for the rotor of a flail-type mowing machine, said rotor having blade-mounting pins, said blade assembly comprising a link having means at one end for hingedly mounting same on one of said blade-mounting pins and having loop means at the other end, a blade member having a shank and two side arms, said shank being received in said loop means with its longitudinal axis parallel to the longitudinal axis of said rotor, said side arms each including a diagonally disposed extension, said extensions being angularly offset from each other with respect to said longitudinal axis of said shank and crossing each other, and said extensions each having a forwardly and a rearwardly facing surface, each of said forwardly facing surfaces having a forwardly facing cutting edge therealong.

4. A blade assembly as claimed in claim 3 in which said link is a steel strip disposed in a plane parallel to the longitudinal axis of said rotor.

5. A blade assembly as claimed in claim 4 in which said loop means is an open loop, and means for removably securing said shank in said open loop.

6. A blade assembly as claimed in claim 3 in which the angular offset between said extensions is of an extend sufficient to provide a clearance between the forwardly facing edge of one extension and the rearwardly facing surface of said other extension.

7. A blade assembly as claimed in claim 3 in which each extension terminates at a point substantially even with the extreme side surface of the side arm associated with the other extension so that the swath cut by said two forwardly facing edges is of a width substantially equal to the over all width of said blade member.

8. A blade as claimed in claim 3 in which said extensions are also each provided with a rearwardly facing cutting edge, along said rearwardly facing surface and means for removably securing said shank in said loop means to permit reversal of said blade member.

9. A blade assembly for the rotor of a flail-type moving machine, said rotor having blade mounting pins disposed parallel to the longitudinal rotor axis, said blade assembly comprising a link including a steel strip of substantial width hingedly mounted at one end of one of said blade-mounting pins and having an open loop at the other end, a blade member having a shank and two side arms providing a C-shaped portion, said shank being received in said open loop with its longitudinal axis parallel to the longitudinal axis of said rotor, said side arms each having a diagonally disposed extension, said extensions being angularly offset from each other with respect to said longitudinal axis of said shank and crossing each other, said extensions each being provided with a forwardly facing cutting edge and a rearwardly facing cutting edge, the ends of each extension terminating at a point substantially even with the extreme side surfaces of said side arms so that the swath cut by said two forwardly facing edges is substantially equal to the width of said C-shaped portion, the angular offset of said extensions providing a clearance between the forwardly facing edge of one extension and the rearward facing edge of the other extension, and means for removably securing said shank in said open loop.

10. A blade assembly as claimed in claim 9 in which said removable securing means comprises a keeper pin extending through said open loop above said shank.

11. A blade assembly as claimed in claim 10 in which said open loop is a U-type open loop having aligned apertures in the opposite walls thereof, said keeper pin extending through said apertures, and a cotter pin for retaining said keeper pin in place.

* * * * *